US009444524B2

(12) United States Patent
Huynh

(10) Patent No.: US 9,444,524 B2
(45) Date of Patent: Sep. 13, 2016

(54) USE OF GEMSTONES WITH EMBEDDED NEAR FIELD COMMUNICATION CHIPS FOR COMMUNICATION WITH NFC ENABLED DEVICES

(71) Applicant: Chi Huynh, San Dimas, CA (US)

(72) Inventor: Chi Huynh, San Dimas, CA (US)

( * ) Notice: Subject to any disclaimer, the term of this patent is extended or adjusted under 35 U.S.C. 154(b) by 0 days.

(21) Appl. No.: 14/517,827

(22) Filed: Oct. 18, 2014

(65) Prior Publication Data

US 2016/0112097 A1    Apr. 21, 2016

(51) Int. Cl.
*H04B 5/00* (2006.01)
*H04W 4/00* (2009.01)
*H04M 1/725* (2006.01)

(52) U.S. Cl.
CPC .......... *H04B 5/0056* (2013.01); *H04B 5/0031* (2013.01); *H04M 1/72561* (2013.01); *H04W 4/008* (2013.01)

(58) Field of Classification Search
CPC .... H04B 5/00; H04B 5/0056; H04B 5/0031; H04W 4/008; H04M 1/72561
USPC .............................. 455/41.1, 41.2, 558, 343.5
See application file for complete search history.

(56) References Cited

U.S. PATENT DOCUMENTS

| 6,868,804 | B1 | 3/2005 | Huisma et al. | |
|---|---|---|---|---|
| 7,962,369 | B2* | 6/2011 | Rosenberg | G06Q 20/20 705/26.1 |
| 7,980,469 | B2* | 7/2011 | Matsuo | G06Q 20/045 235/380 |
| 8,131,645 | B2* | 3/2012 | Lin | G06Q 20/123 380/201 |
| 8,240,568 | B2* | 8/2012 | Matsuo | G06Q 20/045 235/380 |
| 8,280,305 | B2 | 10/2012 | Tamura | |
| 8,768,250 | B2* | 7/2014 | Ma | G06Q 20/3278 455/41.1 |
| 8,942,672 | B2* | 1/2015 | Renard | G06Q 20/3278 455/41.2 |
| 9,042,817 | B2* | 5/2015 | Tse | H04B 5/0031 340/686.6 |
| 9,082,267 | B2* | 7/2015 | Rosenberg | G06Q 20/20 |
| 9,092,813 | B2* | 7/2015 | Pappas | G06Q 10/00 |
| 2004/0112087 | A1* | 6/2004 | Bishop | G01N 21/87 63/32 |
| 2007/0288249 | A1 | 12/2007 | Rowe et al. | |
| 2010/0147226 | A1 | 6/2010 | Tsengas | |
| 2011/0248088 | A1 | 10/2011 | Edouard et al. | |

(Continued)

FOREIGN PATENT DOCUMENTS

CN    102204516 B    12/2012
CN    102332106 B     1/2014

(Continued)

OTHER PUBLICATIONS

JP2014-230581 Office Action mailed Jan. 7, 2016.

*Primary Examiner* — Marceau Milord
(74) *Attorney, Agent, or Firm* — Wagenknecght IP Law Group PC

(57) ABSTRACT

Jewelry incorporating gemstones embedded with near field communication (NFC) chips. Methods of sharing electronic messages using NFC gems by using an NFC enabled device to wirelessly upload an electronic file to a remote computer system over the Internet, wirelessly writing information to an NFC chip embedded in a gemstone, the information including mapping information for accessing the uploaded electronic file and executable instructions to launch and direct a web browser to the electronic file; providing the NFC gem in close proximity to a same or different NFC device to establish near field communication; transferring the information from the NFC chip to the same or different NFC device; and executing the instructions to wirelessly access the electronic file over the Internet.

24 Claims, 10 Drawing Sheets

(56) References Cited

U.S. PATENT DOCUMENTS

| | | |
|---|---|---|
| 2012/0215935 A1 | 8/2012 | Woods |
| 2013/0234899 A1 | 9/2013 | Pope et al. |
| 2013/0254159 A1 | 9/2013 | Thramann et al. |
| 2014/0195675 A1 | 7/2014 | Silver |
| 2014/0198037 A1 | 7/2014 | Leica et al. |
| 2014/0298434 A1 | 10/2014 | Prchal |
| 2015/0134552 A1* | 5/2015 | Engels ............... G06Q 30/0185 705/318 |
| 2015/0140927 A1* | 5/2015 | Chen ................. G06K 19/0727 455/41.1 |
| 2015/0256386 A1* | 9/2015 | Palmer .................. F24F 11/006 709/220 |
| 2015/0263791 A1* | 9/2015 | Chein .................. H04B 5/0031 455/41.1 |
| 2015/0294214 A1* | 10/2015 | Boulby ............ G06K 19/07758 340/10.6 |

FOREIGN PATENT DOCUMENTS

| | | |
|---|---|---|
| JP | 2007-091453 | 12/2007 |
| JP | 3176725 | 7/2012 |
| WO | 2005015986 A2 | 2/2005 |
| WO | 2014/016609 A1 | 1/2014 |
| WO | 2016/089965 | 6/2016 |

* cited by examiner

FIG. 1A  FIG. 1B

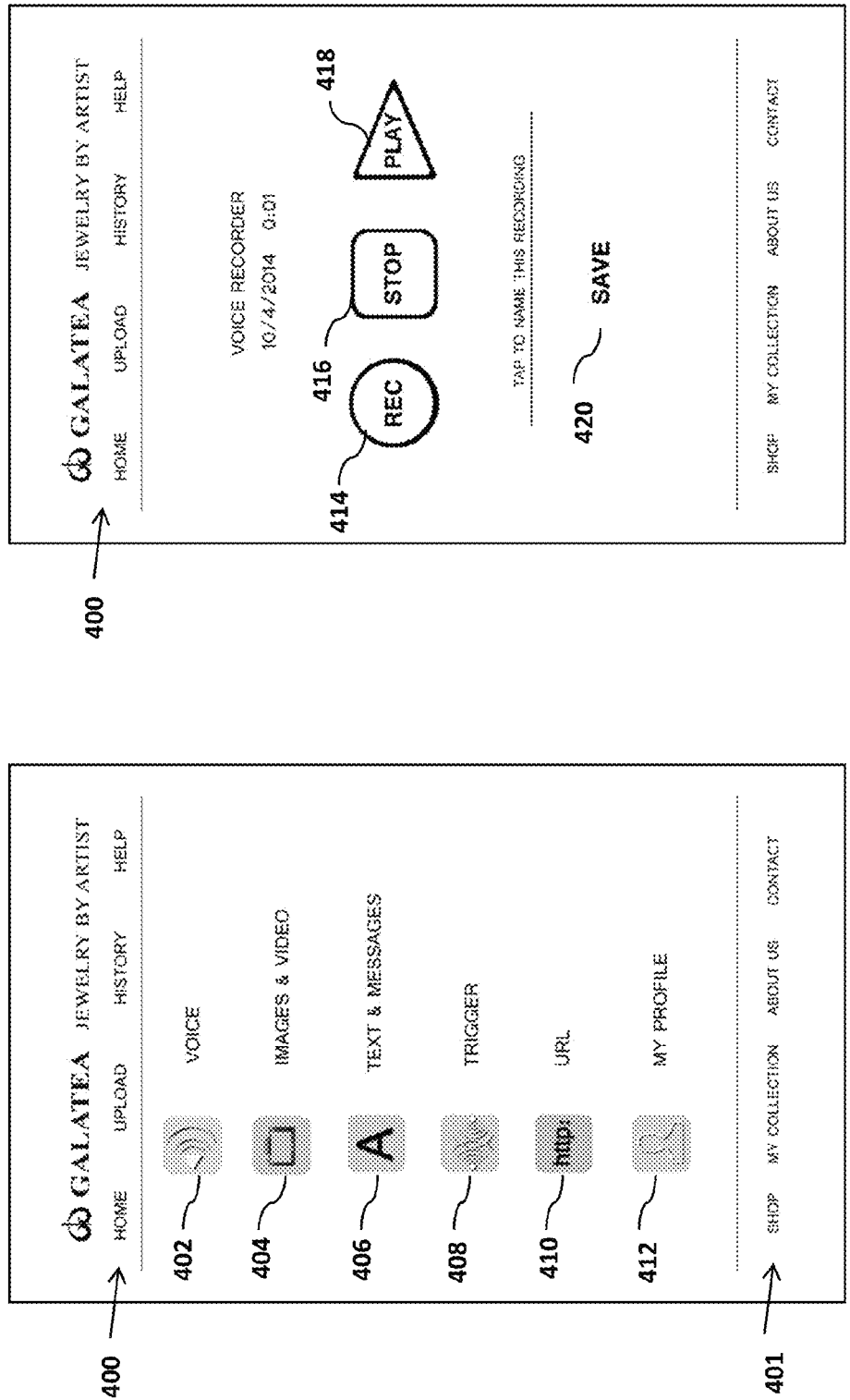

USE OF GEMSTONES WITH EMBEDDED NEAR FIELD COMMUNICATION CHIPS FOR COMMUNICATION WITH NFC ENABLED DEVICES

TECHNICAL FIELD

The invention relates to the field of jewelry and expressions of communication and mores specifically to methods of personal connection or communication through the use of gemstones that contain near field communication chips.

BACKGROUND OF THE INVENTION

Jewelry is often given at special occasions, such as birthdays, anniversaries, vacations or other memorable life events. Participants often wish to relive these memories; however, the moment itself is often not recorded or the recording is lost among other recordings and can lose its intended close association with the jewelry. Therefore there is a need to provide methods that closely associate gemstones or jewelry, with a mechanism to record and retrieve special memories.

Among the precious gems, pearls are some of the most special and unique. A pearl is formed from a biological process. In particular, it is a mollusk's natural defense against a foreign particle. The particle acts as an irritant and stimulates secretion of a viscous substance, which hardens into a nacre coating around the particle. The desirability of pearls has led to theft widespread cultivation within a variety of mollusks. Among these *Pinctada fucata, Pinctada maxima, Pictanda margaritifera* have become some of the more popular sources for pearl production however mollusks such as abalone, conch and others are also currently used to produce highly sought after pearls.

Pearl farming is a well-established practice, where a foreign particle, typically referred to as a bead in the form of a polymeric sphere, a broken shell or a piece of mantle tissue, is seeded into a recipient mollusk and the mollusk is permitted to coat the bead with the nacre to form the pearl. U.S. Pat. No. 7,062,940 issued to Huynh provides a clever improvement to this approach where a gemstone is seeded into the mollusk and the resulting pearl is carved to expose the underlying gemstone nucleus, thereby producing a number of eye catching designs that combine the beauty of pearls, the implanted gemstones and the artistry of the carving itself. While a number of pearls have been artistically carved, the beauty in the gem is still limited to its appearance.

Radio frequency identification (RFID) is commonly used in tracking purposes, often to replace bar codes. RFID tags contain an antenna and a memory chip that stores data. Identifying or reading the data is accomplished using an RFID reader. RFID tags have become widespread in the retail industry by helping stores to keep track of inventory. RFID tags are also used in the cattle industry to monitor feeding and tracking of possible spread of disease through recording and comparing the positioning of animals over time.

RFID tags have also been incorporated into pearls. In WO2005/015986, a method of making a pearl is demonstrated where an RFID chip is fixed to the surface of the nucleus before the nucleus is inserted into the pearl oyster. This prevents identifying information specific to each pearl from being erased for tracking or classification purposes. Similarly, CN102332106B provides an approach to identify and manage pearls by embedding an RFID chip in a pearl for identification purposes. The RFID chip is added after boring into the pearl because the chip could be easily damaged if provided as part of a nucleus. While this approach may be used to track pearls, it lacks any mechanism to record or re-live a special memory.

Near field communication (NFC) is a more finely honed version of RFID. It operates within a maximum range of about 4-10 cm and can operate in one- or two-way communication. NFC communication involves the modulation of an electric field or a magnetic field. NFC-enabled features are now commonly integrated into smart phones. This technology is being adopted for financial transactions where touching a NFC smart phone to a NFC checkout terminal, instructs payment thereby replacing credit cards. In addition, data can be shared directly between NFC smart phones by just tapping phones together. While NFC has been adapted for mobile payments or sharing data between NFC devices, its use is limited to certain transactions and does not associate jewelry with a special memory.

SUMMARY OF THE INVENTION

The object of the invention is to provide compositions, systems and methods that associate gemstones with special memories and personal expression. This is accomplished through the use of an NFC gem coupled with the memories or personal expressions in an electronic file that is accessed through close interaction with the gem.

The above is accomplished in one aspect of the invention by providing a method of sharing electronic messages through a near field communication (NFC) gem, the method includes providing an NFC device with memory; providing an NFC gem in close proximity to the NFC device to establish near field communication, wherein the NFC gem is a gemstone having an embedded NFC chip with memory formatted for writing and rewriting; running NFC software on the NFC device; using the NFC device to wirelessly upload an electronic file to a remote computer system over the Internet; wirelessly writing information to the NFC chip, the information comprising mapping information for accessing the uploaded electronic file and executable instructions to launch and direct a web browser to the electronic file; providing the NFC gem in close proximity (such as 0 to 8 cm, but preferably 0 to 4 cm) to a same or different NFC device to establish near field communication; running NFC software on the same or different NFC device; transferring the information from the NFC chip to the same or different NFC device; and executing the instructions to wirelessly access the electronic file over the Internet. In preferred embodiments the NFC device is an NFC enabled mobile phone but can be an NFC enabled tablet or NFC enabled laptop or other NFC enable computer.

Exemplary gemstones for use in manufacturing a suitable NFC gem include an agate, an alexandrite, an amber, an ametrine, an amethyst, an aquamarine, an apatile, a beryl, a bloodstone, a chrysoberyl or cat-eye, a citrine, a corundum, a chalcedony, a chysocolla, a coral, a diamond, an emerald, a green beryl, a garnet, a quartz, a lolite, a jadcite, a kupzite, a lapis lazuli, a moonstone, a malachite, a moamite, an onyx, an opal, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon. Preferably, the gem is a pearl.

In some embodiments, the NFC chip is preloaded with executable instructions to identify whether or not a communicating NFC device is loaded with NFC software for writing to NFC chips or a predetermined version of NFC software and if not, opening and directing a web browser of the NFC device to a web page offering the NFC software for download. The electronic file for uploading is preferably a text file, a picture file, a video file, and an audio file.

In some embodiments the mapping information used to access the electronic file is assigned by the remote computer system and downloaded to the NFC device prior to writing. In other embodiments the mapping information is assigned by the NFC device prior to writing.

The method may also include storing an identifier for the NFC gem in one of the NFC devices; and uploading a new electronic file to the remote computer system for access using the information previously written to the NFC gem. In some embodiments, this new electronic file replaces the initial electronic file. The identifier can be a sole identifier stored in a database or may be one of a plurality of identifiers for different NFC gems in a database stored in memory of the one of the NFC devices.

In a related aspect, a method of sharing electronic messages through an NFC gem is provided, which includes providing an NFC device with memory; providing an NFC gem in close proximity to the NFC device to establish near field communication, wherein the NFC gem is a gemstone with an embedded NFC chip that can be written and rewritten; running NFC software on the NFC device; wirelessly writing information to the NFC chip, the information selected from the group consisting of an audio file, a text file and executable instructions to launch and direct a web browser to a uniform resource locator (url); providing the NFC gem in close proximity to a same or different NFC device to establish near field communication; running NFC software on the same or different NFC device; transferring the information from the NFC chip to the same or different NFC device; and playing the information on the NFC device.

Embodiments provided with the first aspect equally apply to the related aspect. For example, the NFC device can be an NFC enabled mobile phone. The gemstone can be an agate, an alexandrite, an amber, an ametrine, an amethyst, an aquamarine, an apatile, a beryl, a bloodstone, a chrysoberyl or cat-eye, a citrine, a corundum, a chalcedony, a chysocolla, a coral, a diamond, an emerald, a green beryl, a garnet, a quartz, a Iolite, a jadcite, a kupzite, a lapis lazuli, a moonstone, a malachite, a moamite, an onyx, an opal, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon. The gem can be a pearl. The close proximity can be characterized as 0 to 8 or 0 to 4 centimeters (cm). The NFC chip can be preloaded with executable instructions to identify whether or not a communicating NFC device is loaded with NFC software for writing to NFC chips or a predetermined version of NFC software and if not, a web browser may be opened and directed to a web page offering the NFC software for download.

In another related aspect, a method of sharing electronic messages through an NFC gem is provided, which includes providing an NFC device with memory; providing an NFC gem in close proximity to the NFC device to establish near field communication, wherein the NFC gem is a gemstone with an embedded NFC chip that can be written and rewritten; running NFC software on the NFC device; engaging a service provider that delivers electronic files to NFC devices in response to receiving authorized requests; wirelessly writing information to the NFC chip, the information comprising an authorized request and executable instructions to direct the authorized request to the service provider; providing the NFC gem in close proximity to a same or different NFC device to establish near field communication; running NFC software on the same or different NFC device; transferring the information from the NFC chip to the same or different NFC device; executing the instructions thereby requesting the electronic file by the same or different NFC device; and delivering the electronic file from the service provider to the same or different NFC device.

The above embodiments also apply to this related method. For example, The NFC chip can preloaded with executable instructions to identify whether or not a communicating NFC device is loaded with NFC software for writing to NFC chips or engaging the service provider and if not, the method can include opening and directing a web browser of the NFC device to a web page offering the NFC software for download. Further, each time a same authorized request is received by the service provider a different electronic file or a random electronic file may be delivered to the same or different NFC device. Nonlimiting examples of electronic files can include a horoscope or a bible verse.

Similar to the above embodiments, the authorized request can be defined by the service provider or by the NFC software.

In another related aspect of the invention, a method of sharing electronic messages through an NFC gem is provided, which includes providing an NFC device with memory; providing an NFC gem in close proximity to the NFC device to establish near field communication, wherein the NFC gem is a gemstone with an embedded NFC chip that can be written and rewritten; running NFC software on the NFC device; obtaining a url from a web site; wirelessly writing information to the NFC chip, the information comprising the url and executable instructions to launch and direct a browser to the url; providing the NFC gem in close proximity to a same or different NFC device to establish near field communication; running NFC software on the same or different NFC device; transferring the information from the NFC chip to the same or different NFC device; and executing the instructions thereby browsing to the url. The above embodiments also apply to this related aspect.

BRIEF DESCRIPTION OF THE DRAWINGS

Embodiments of the invention can be better understood with reference to the following drawings, which are part of the specification and represent preferred embodiments. The components in the drawings are not necessarily to scale, emphasis instead being placed upon illustrating the principles of the invention. And, in the drawings, like reference numerals designate corresponding parts throughout the several views.

FIGS. 1A-1C are diagrams depicting the offset positioning 12a, 12b of an NFC chip 12 in a pearl nucleus 14. FIGS. 1B and 1C are cross section views.

FIGS. 8A-8D are screen shots of NFC software for uploading electronic messages and writing information to an NFC gem.

DETAILED DESCRIPTION OF PREFERRED EMBODIMENTS

For clarity of disclosure, and not by way of limitation, the invention is discussed according to different detailed embodiments; however, the skilled artisan will recognize through the guidance herein that features of one embodiment can be combined with other embodiments and therefore such combinations are within the intended scope of the invention.

Unless defined otherwise, all technical and scientific terms used herein have the same meaning as is commonly understood by one of ordinary skill in the art to which this invention belongs. If a definition set forth in this document is contrary to or otherwise inconsistent with a definition set forth in the art, the definition set forth in this document prevails over a contradictory definition.

The term "NFC chip" as used herein refers to an unpowered integrated circuit capable of near field communication and capable of storing data into memory and having an antenna for electric field modulation. NFC chips are capable of communicating with NFC enabled mobile devices.

The term "NFC gemstone" or "NFC pear" as used herein refers to a gemstone or pearl having an embedded NFC chip, which is capable of communicating with a NFC enabled mobile device.

The term "NFC device" as used herein refers to an NFC-enabled electronic device, such as a NFC enabled mobile phone or tablet computer.

The term "offset from the center of the pearl" or "offset from the center of the nucleus" as used herein refers to a position that does not traverse the midpoint of a pearl.

The term "mapping" as used herein refers to the recording of a position of an electronic file so that it can later accessed.

Figure 1C:
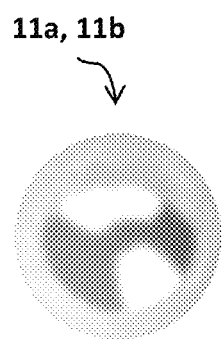
Figure 1C:
Figure 1C:
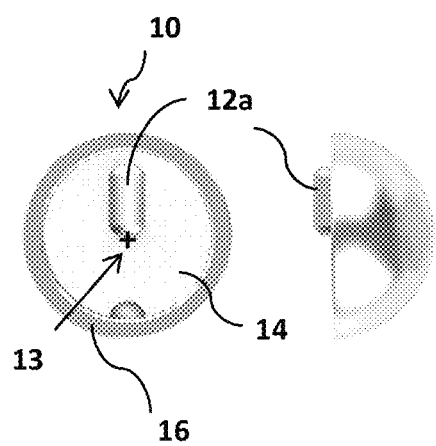
Figure 1C:
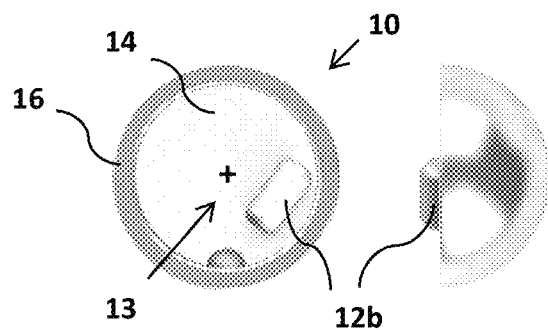

Turning to FIGS. 1A-1C, in one aspect of the invention a near field communication (NFC) gem 10 is provided, characterized as a gemstone 11a having an embedded NFC chip 12. In a preferred embodiment the gemstone is a pearl 11b, which includes a nucleus 14 and a nacre 16 coating, the nucleus 14 including the NFC chip 12 preferably embedded offset 12a, 12b from a center 13 of the pearl 11b. The NFC chip 12 is configured to transmit near field communication at a maximum of only a few centimeters or less, thereby permitting near field communication between the pearl 11b and an NFC device, such as an NFC enabled mobile phone, at short distances. By providing a pearl 11b with an embedded NFC chip 12 that is rewritable, a pearl 11b has been developed having an embedded memory that can be rewritten numerous times to couple memories or personal expressions that can be enjoyed while viewing the pearl 11b. As will become evident, the pearl 11b will be able to communicate with mobile devices, such as NFC-enabled mobile phones having a suitable software application and can direct further communication between the mobile phone and one or more remote computer systems over the Internet to retrieve additional files and services that can be enjoyed in concert with the gemstone or jewelry incorporating the gemstone.

In some instances, the a plurality of NFC gems 11a in the form of pearls 11b are arranged in an article of jewelry, such as strung along a necklace or bracelet, such that only one NFC gem 11a communicates with an NFC device at a time to ultimately communicate a message as a series of shorter messages.

When providing the gemstone 11a in the form of a pearl 11b, the skilled artisan will appreciate that the invention may be embodied in different types of pearls 11b. Pearls 11b may be fresh water or salt water pearls 11b. Pearls 11b may be cultured in any suitable region and may carry corresponding certifications or designations as known in the jewelry industry. As such, the pearls 11b may be white or golden South Sea pearls 11b, black Tahitian pearls 11b or any other cultured pearl 11b, also referred to as an Akoya pearl 11b.

In a related embodiment, the NFC gem 10 may be a gemstone 11a with an embedded or coupled NFC chip 12, where the gemstone 11a is optionally selected from the group consisting of an agate, an alexandrite, an amber, an ametrine, an amethyst, an aquamarine, an apatile, a beryl, a bloodstone, a chrysoberyl or cat-eye, a citrine, a corundum, a chalcedony, a chysocolla, a coral, a diamond, an emerald, a green beryl, a garnet, a quartz, a lolite, a jadcite, a kupzite, a lapis lazuli, a moonstone, a malachite, a moamite, an onyx, an opal, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon.

Figure 2A:
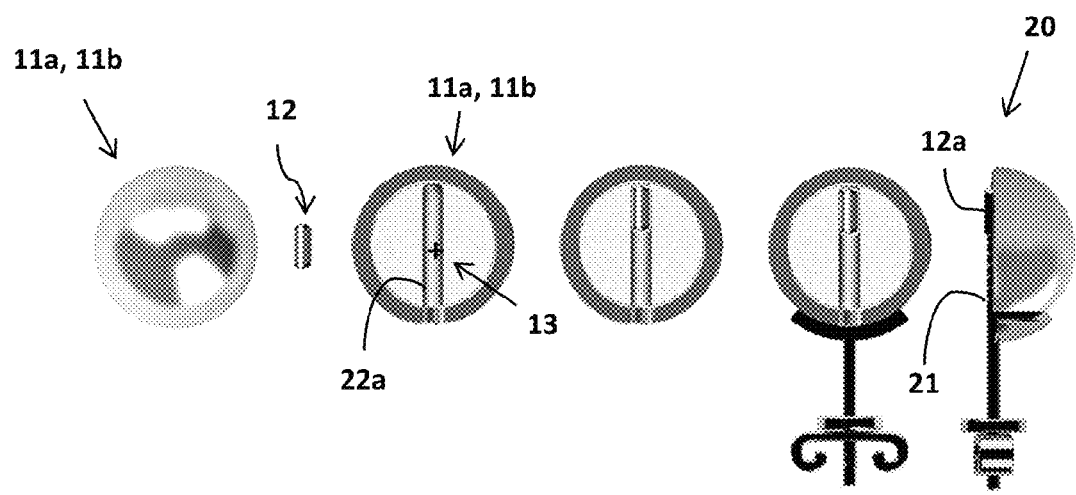
FIGS. 2A-2B are diagrams with cross section views depicting the offset positioning 12a, 12b of an NFC chip 12 as oriented with an inserted mounting shaft 21 or string 23.
Figure 2B:
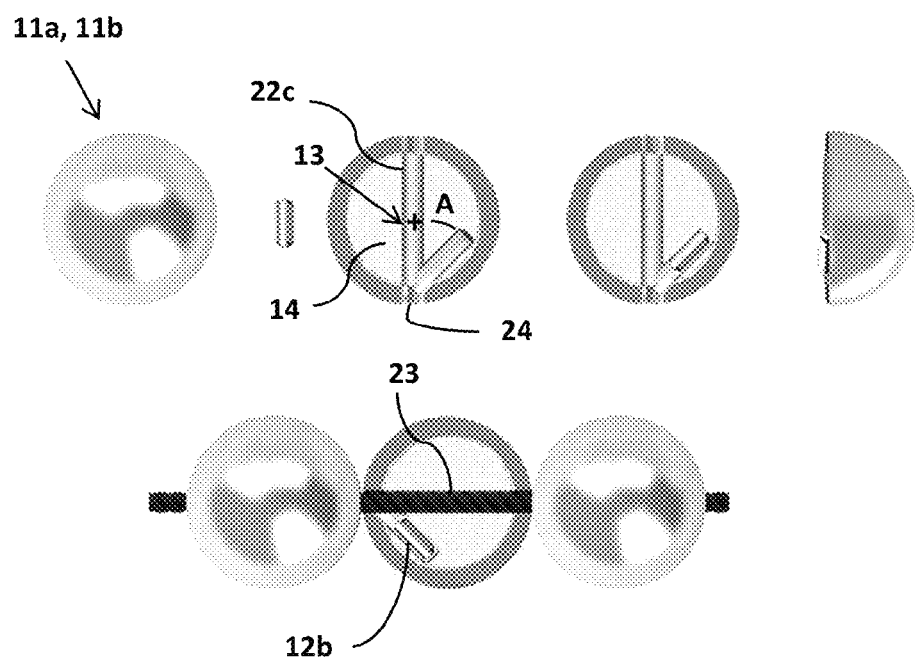

Turning now to FIGS. 2A-2B. While most gemstones 11a are conventionally crimped or glued using jeweler's adhesives into jewelry settings without boring, pearls 11b are frequently incorporated into jewelry by inserting and gluing a shaft 21 into a complementary bore 22a, which is drilled partially into the pearl 11b or by threading a string 23 entirely through a throughbore 22c. Such bores 22a and throughbores 22c are conventionally aligned to proceed to or through the center 13 of the nucleus 14. Since the NFC chip 12 is preferably offset 12a, 12b from the center 13 of the pearl nucleus 14 it can escape damage when performing jewelry manufacturing operations, such as boring or throughboring.

The NFC chip 12 can be positioned offset 12a, 12b from the center 13 of the pearl 11b using different approaches. Turning in more detail to FIG. 2A, in some embodiments, which may be used when the pearl 11b is to be mounted to a solid mounting shaft 21 that does not the traverse the entire pearl 11b, as commonly used in the case of earrings 20 and rings, a single cavity 22a can be drilled into the pearl 11b having a depth equal to or greater than the length of the mounting shaft 21 and NFC chip 12. The NFC chip 12 can be inserted, followed by insertion of the mounting shaft 21 into the same cavity 22a. The NFC chip 12 can be further secured within the pearl 11b by adding an adhesive or resin to the cavity 22a. The skilled artisan will appreciate that an approach of forming a single bore 22a for insertion of the NFC chip 12 into gemstones 11a in lieu of pearls 11b, may also be performed. In each instance, the NFC chip 12 can be glued or sealed with an adhesive. Preferably, the NFC chip 12 is preformatted prior to insertion into the pearl 11b or other gemstone 11a.

Figure 3A:
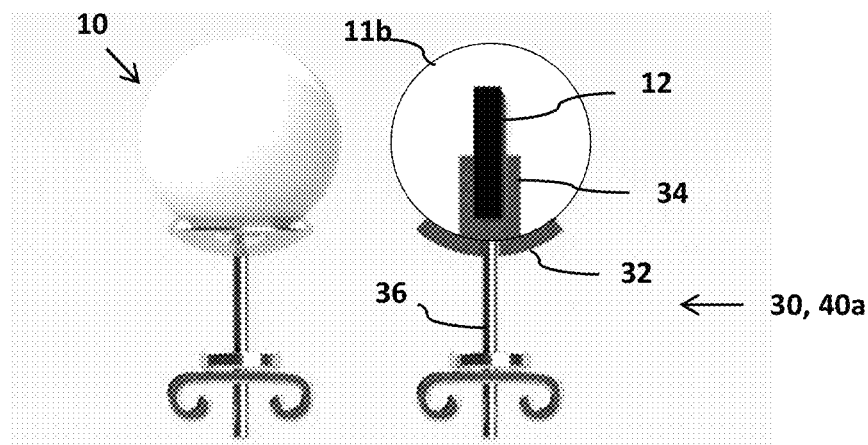
FIGS. 3A-3C depict jewelry mountings 30 incorporating NFC chips 12 for insertion into a pearl 11b. Shown are front views and cross section views.
Figure 3B:
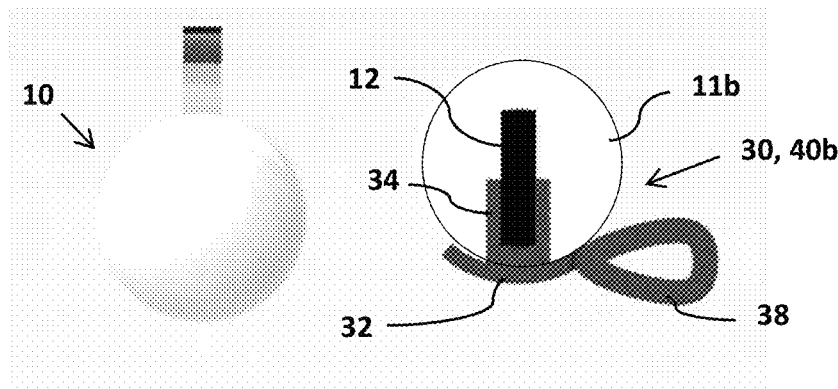
Figure 3C:
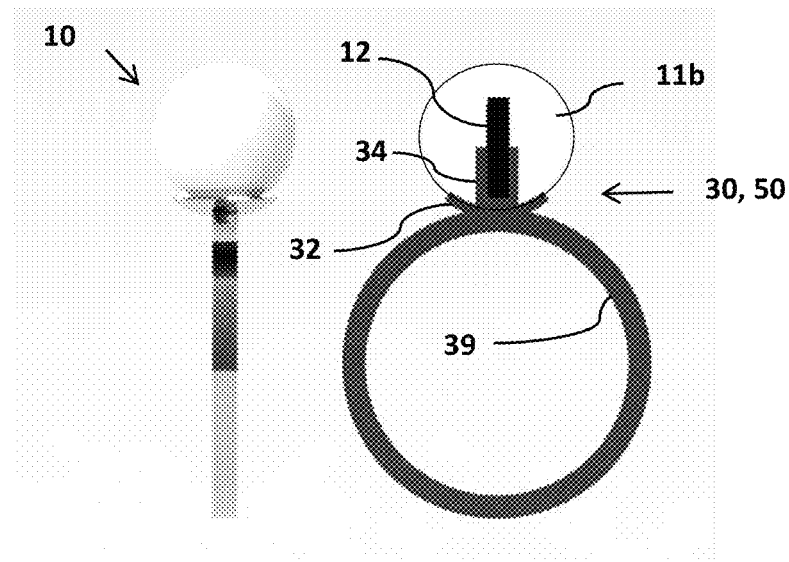

In a related embodiment shown in FIGS. 3A-3C, the NFC chip 12 is provided together with the jewelry mount 30 and inserted into a pearl 11b to form a NFC gem 10. Accordingly, the invention also includes a gemstone mounting 30, preferably a pearl mounting 30. The gemstone mounting 30 is optionally selected from the group consisting of an earring mounting 40a, 40b, a ring mounting 50, and cufflink mounting, and a charm or pendent mounting. The gemstone mounting 30 includes a base 32, preferably a concave base 32 for mounting pearls 11b, and a hollowed sleeve 34 extending upward from the base 32, preferably from the center of the base 32. Within the hollowed sleeve 34, and optionally extended outward therefrom, is positioned a NFC chip 12. This economizes on boring depth. Preferably the hollowed sleeve 34 and NFC chip 12 are cylindrical in shape. The base 32 includes a structure defining the type of mounting 30. In some embodiments, beneath the base 32 extends a linear rod 36 to form a stud earring mounting 40a for pearls 11b. In other embodiments, behind the base 32 extends a nonlinear structure 38 or clasp to form an earring mounting 40b for pearls 11b. In still other embodiments, beneath the base 32 is a circular structure 39 to form a ring mounting 50 for pearls 11b. In other embodiments, underneath the base 32 is a linear rod for insertion into an aperture for mounting the gemstone to a structure to form an article of jewelry Returning to FIG. 2B, a second positioning method includes two cavities 22c, 22b drilled from a shared entry port 24, the first cavity 22c being a bore or a throughbore traversing the center 13 of the pearl 11b and the second cavity 22b drilled at an angle A offset from the first 22c. This configuration may be preferred when stringing pearls 11b along a same strand 23 since drilling multiple holes in a same pearl 11b can affect its appearance and is disfavored. Typically, the second cavity 22b is be at an offset angle A from 20-60 degrees or 45 degrees from the center cavity 22c but may be any suitable angle A that forms two distinct cavities 22c, 22b and positions the NFC chip 12 away from the center 13 of the pearl 11b. In such an embodiment, the NFC chip 12 is inserted into the offset cavity 22b and the jewelry mount, such as a string 23, is inserted through the center cavity 22c.

Figure 4:
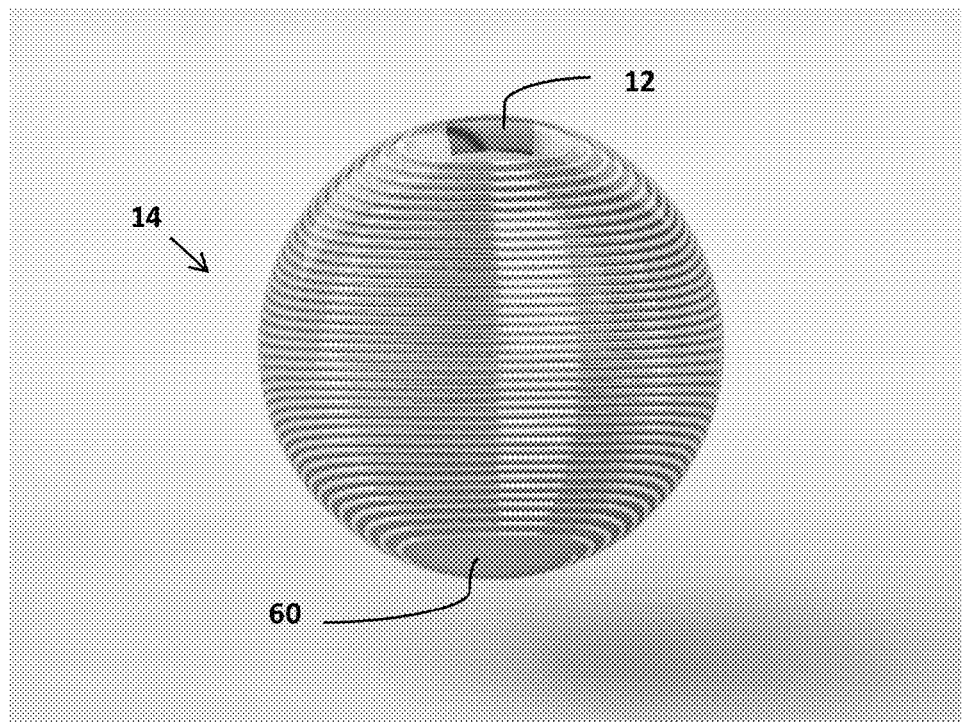
FIG. 4 depicts a pearl nucleus 14 incorporating an NFC chip 12 coupled to an implantable bead 60.
Figure 5:
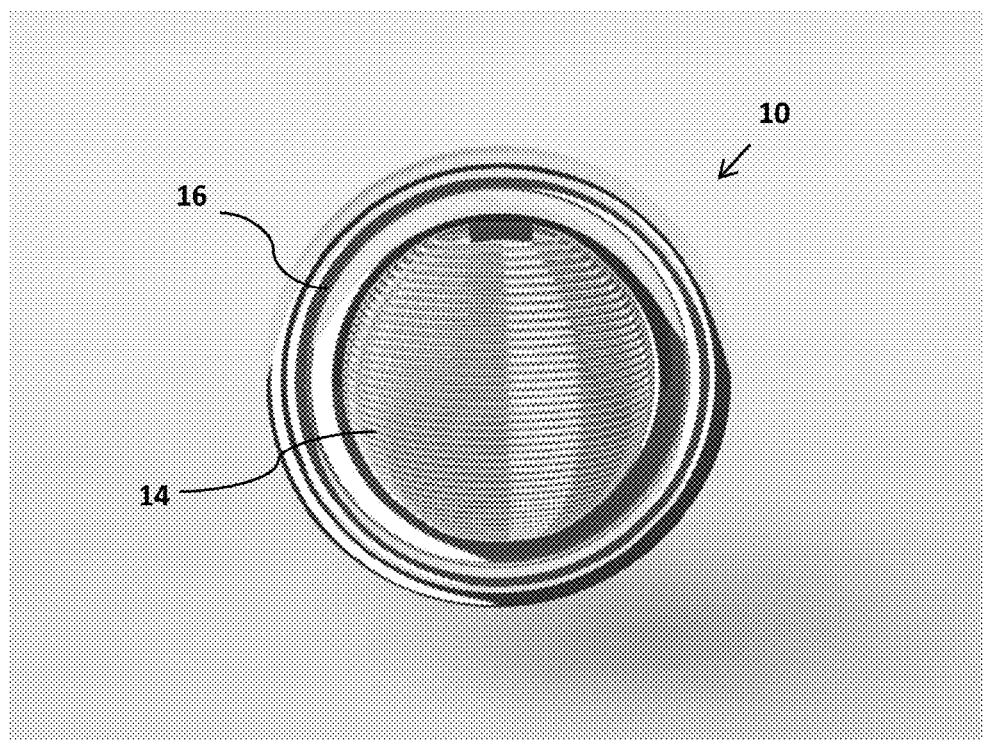
FIG. 5 is a cross section view of a NFC gem 10 with a nacre 16 coating grown around the implanted nucleus 14 of FIG. 4.

A third method is shown in FIG. 4 and FIG. 5, where a bead 60 is formed with an integrated NFC chip 12 as a pearl nucleus 14 and inserted into the mollusk to form the NFC gem 10. The NFC chip 12 may be attached to the bead 60 using any suitable approach, such as but not limited to drilling, gluing, and embedding. In some embodiments, the NFC chip 12 is mounted then spiraled around the bead 60. Preferably, the entire nucleus 14 is coated with a protective coating, such as a biocompatible coating prior to insertion into the mollusk. The biocompatible coating may assist in preventing oxidation of NFC chip 12 components prior to coating with nacre 16 and should be nontoxic to the mollusk. Such coatings may include a polylactide, polyethylene terephthalate (PET), glass or other biocompatible polymers and silicates known in the medical implant arts. Alternatively, the coating can include a protective layer of resin.

After insertion, the mollusk is incubated to allow the nacre 16 coating to form about the nucleus 14 with NFC chip 12. The incubation time may vary according to the mollusk and the culture conditions. As a general guideline the nacre 16 coating occurs at about 0.5 millimeters per year however this may vary. The preferred thickness of the nacre 16 coating post incubation is from about 0.2 millimeters thick to about 1.5 millimeters thick. The thickness of the nacre 16 coating determines in part the per rating in Akoya pearls. Pearls having a nacre 16 coating of about 0.25 mm or less are likely to be rated as "A"; whereas nacre 16 coatings of 0.4 mm on each side might achieve a "AAA" rating. Using the provided general guideline, this may require an incubation step from about six months to about eighteen months however the skilled artisan will appreciate that results may vary depending on mollusk and environmental conditions.

Turning back to FIGS. 1A-C and 2A-B, after harvest, the pearl 11b may be assessed to determine the relative offset position 12a, 12b of the NFC chip 12 within the pearl 11b to ensure the NFC chip 12 remains intact and undamaged during any drilling, such as while creating bores 22a, 22b or throughbores 22c for mounting to form an article of jewelry. This can be done by placing the pearl 11b under a suitable microscope, x-ray detector or other detection apparatus capable of identifying the NFC chip 12, identifying the offset 12a, 12b placement of the NFC chip 12 within the pearl 11b and marking its position, such as with a removable ink along the outside of the pearl 11b. The pearl 11b can then be safely drilled remote from the marking to ensure the NFC chip 12 is not damaged.

The present invention recognizes cleaning, polishing and tumbling cultured pearls 11b are commonplace in the industry and have related benefits with the present invention. The cleaning, polishing and tumbling processes may be any known to those skilled in the jewelry arts. For example, diamond polishers having silicone wheels are commonplace in the jewelry industry and are useful in the polishing of the pearl 11b, with or without embedded NFC chips 12. Further, a variety of polishers are available and provide coarse, fine and high polish. Polishing wheels such as those that incorporate a natural bristle, a synthetic bristle, a brush, or a buff may also be useful in cleaning and polishing the pearl 11b. As a final finish, a buffing wheel may be used with or without a diamond polishing powder. The skilled artisan will appreciate configurations that embed or couple NFC chips 12 to other gemstones 11a may also incorporate cleaning, polishing and/or tumbling of the gemstone 11a as known in the jewelry arts.

Figure 6A:
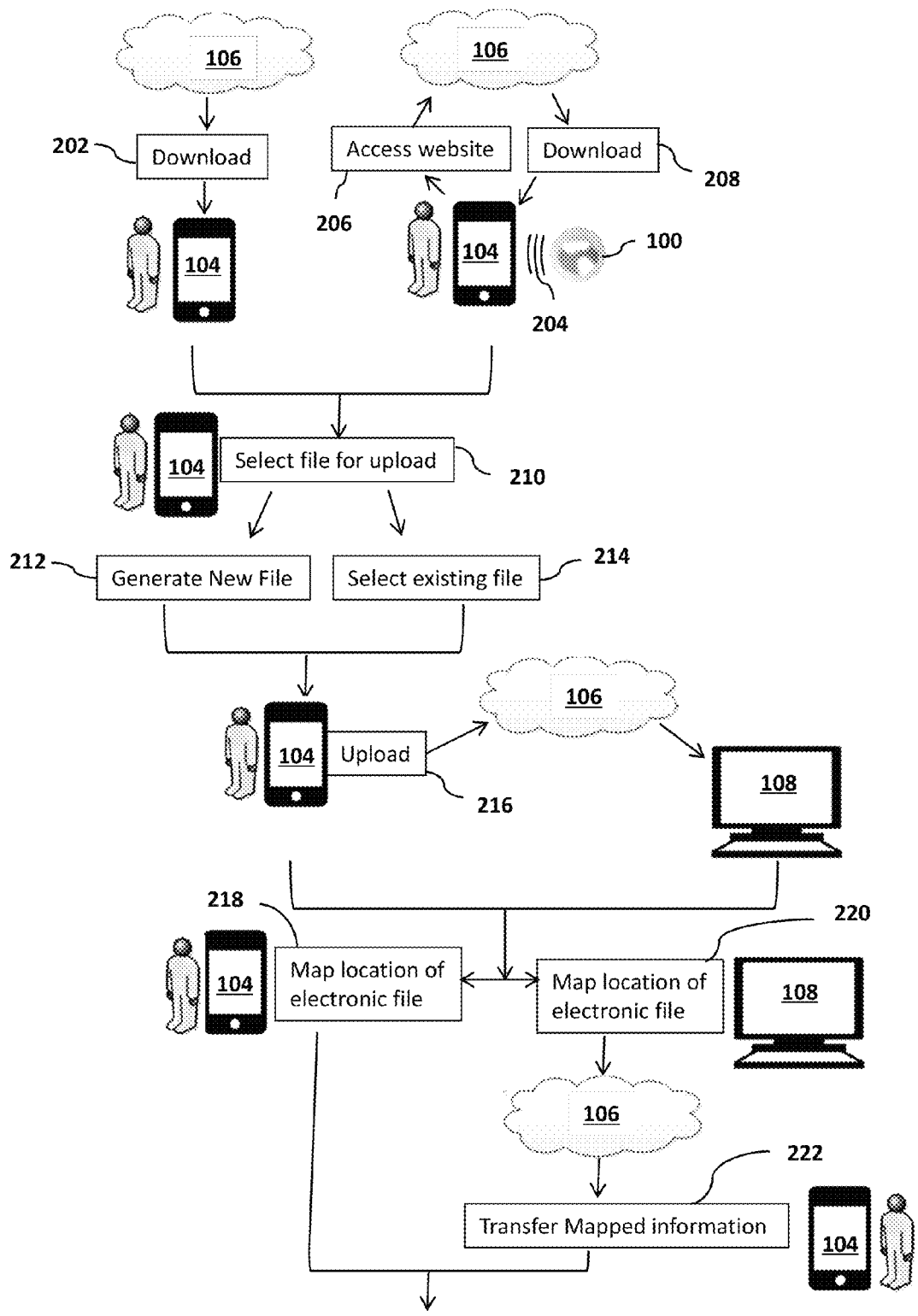
FIG. 6A-6C is a flow chart depict an exemplary method of using an NFC gem 100 to share electronic messages.
Figure 6B:
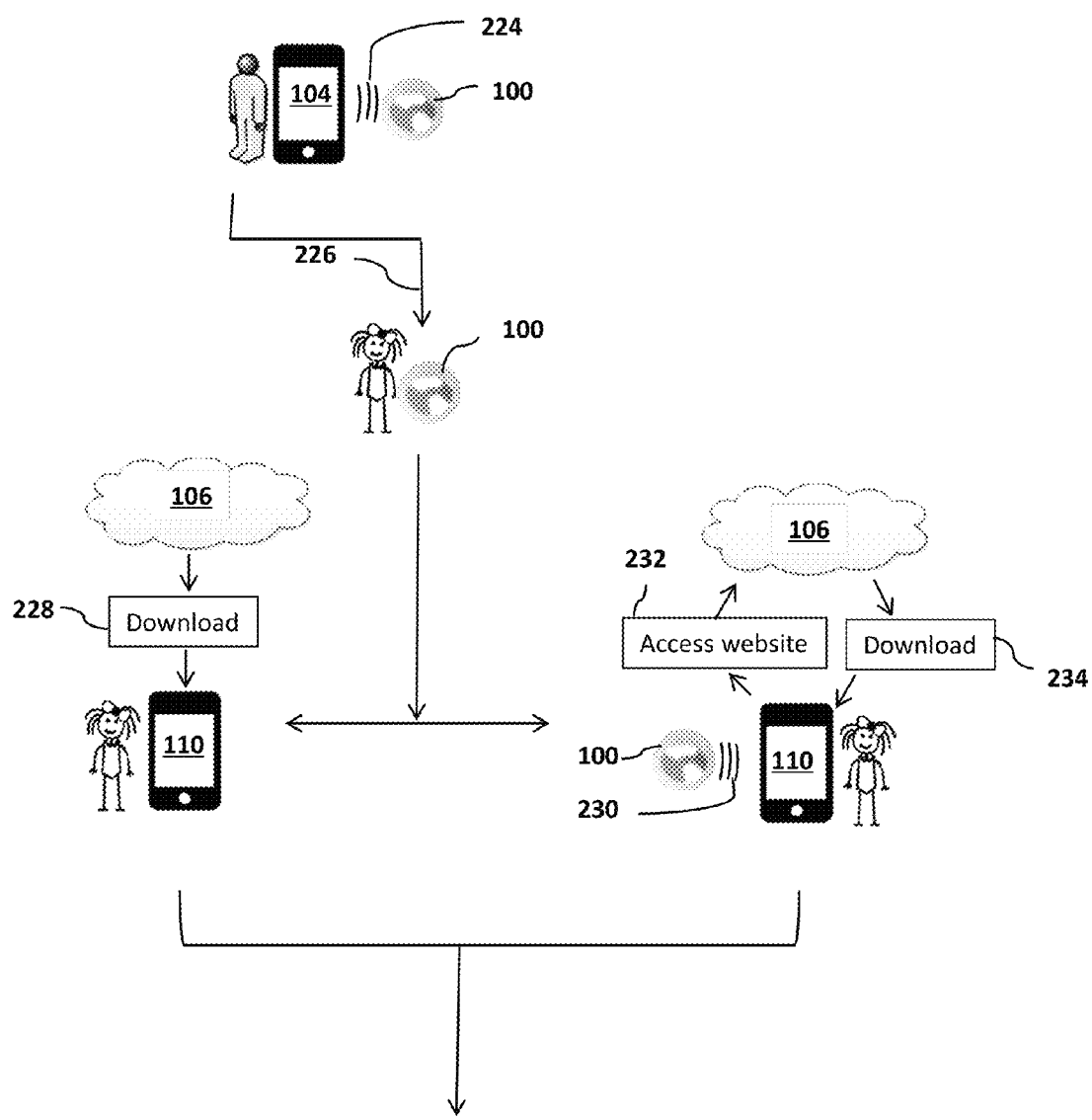
Figure 6C:
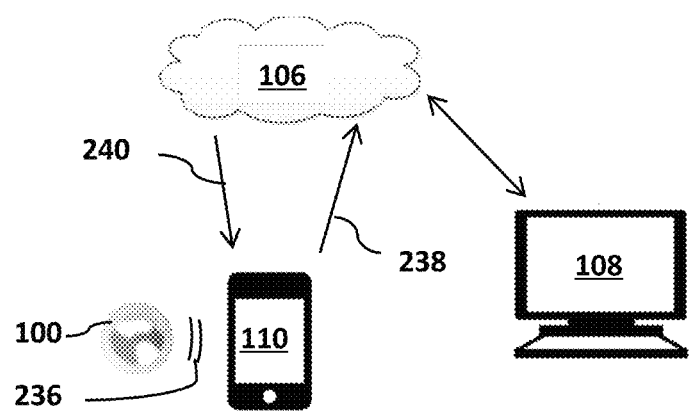

FIGS. 6A-C is a guiding flow chart demonstrating use of an exemplary method of communicating personal memories or messages through an NFC gem 100. The method begins after purchasing or manufacturing the NFC gem 100, which is discussed above. In step 202, the NFC software is downloaded into a user's NFC device 104, such as over the Internet 106. In some embodiments the NFC software is obtained without assistance from the NFC gem 100 and is initiated independent of the NFC gem 100, such as by visiting a software applications site and purchasing an NFC program for download. However, in other embodiments the NFC gem 100 is preloaded with an executable command such that when read 204 by the user's NFC device 102, the NFC device 104 attempts to a launch the NFC software, and if not found executes a command to open a web browser on the customer's NFC device 104 and direct the browser to a web site as shown in step 206 where NFC software can be purchased or downloaded 208. In still another embodiment, the NFC gem is preloaded to display an option of visiting a web site to obtain one or more versions of NFC software and if selected, directs a browser to a web site where the one or more versions of NFC software can be purchased or downloaded.

In step 210, the user selects an electronic file for upload using the NFC software. The step of selecting a file can include selecting an electronic file among a plurality of electronic files stored in memory on the NFC device 104 as shown in step 214 or generating a new file as shown in step 212, such as recording a new voice message or taking a new photograph or video and choosing the new file for upload. In alternative embodiments, an electronic file is downloaded into memory of the NFC device 104, such as through a customer's electronic mail (email) then identified for upload. The step of selecting an electronic file can be performed using methods for selecting files on electronic devices as known in the software and mobile phone arts.

Next, in step 216, the electronic file is wirelessly uploaded to a remote computer system 108 through the Internet 106. In some embodiments, the user directs the NFC software to establish a user account with an account hosting provider, which provides memory for storing electronic files for later retrieval. Methods of establishing user accounts on remote computer systems are well known in the present art and often require establishing a unique user login and user password. Preferably the user account permits the uploading, storing and retrieval of audio files (such as .mp3 files), picture files (such as .jpg, .gif and .tiff files), movie files (such as .mp4 and .mov files) and text files. The skilled artisan will appreciate that other wireless connections to remote computers may be selected in lieu of through the Internet and are encompassed by the invention. For example, such systems may include direct wireless communication through different electric field spectra, such as but not limited to 2.4 to 2.485 GHz or spectrum under the BLUETOOTH standard.

In some embodiments defining the location of the electronic file on the remote computer system, also referred to herein as "mapping the location" or "mapping information", is performed by the NFC software as shown in step 218. This can be done by assigning a string of alphanumeric characters referencing the user's account and followed by a corresponding file name, or folder and file name as known in the computer arts. In other embodiments the remote computer hosting the electronic file assigns the string of alphanumeric characters and transmits this mapping information back to the NFC device for writing as shown in steps 220 and 222.

In step 224, the information including the mapped location and instructions to launch and direct a web browser to the mapped location is written to the NFC gem 100 using the NFC software loaded on the NFC device 104. Writing information to the NFC gem 100 includes positioning the NFC gem 100 and NFC device 104 in close proximity, such as within 0 to 8 cm, preferably 0 to 4 cm, and instructing the NFC device 104 to wirelessly write the information to the NFC gem 100.

In step 226, the NFC gem 100 is gifted or transferred to a recipient. Preferably, the NFC gem 100 or NFC gem-based jewelry is given to the recipient as a gift akin to the giving of jewelry for a special occasion.

In step 228, the recipient downloads the NFC software onto the recipient's NFC device if not currently loaded. In some embodiments the NFC software is obtained without assistance from the NFC gem and is initiated independent of the NFC gem, such as by visiting a software applications site and opening the program after download; however, in other embodiments the NFC gem 100 is preloaded with an executable command such that when read by the recipient's NFC device 110, there is an attempt to a launch the corresponding NFC software, and if not found executes a command to open a web browser on the customer's NFC device 110 and direct the browser to a web site where a the NFC software can be downloaded as shown in steps 230-234. In still another embodiment, the NFC gem 100 is preloaded to display an option of visiting a web site to obtain one or more versions of NFC software and if selected, directs a browser to a web site where the one or more versions of NFC software can be purchased or downloaded.

In step 236, the recipient's NFC device 110 receives the information from the NFC gem 100 when in close proximity to the NFC gem 100. Positioning the NFC gem 100 and receiving NFC device 110 in close proximity causes the transfer of information and any execution instructions to the receiving NFC device 110.

In step 238, the transferred information launches a web browser in the recipient's NFC device 110 and directs the browser to the mapped location of the electronic file at the remote computer system 108 so that it is retrieved or accessed.

In step 240, the recipient retrieves and plays the electronic file to enjoy the recorded memory or message together with the NFC gem 100. Retrieving an electronic file can include downloading the electronic file into memory of the NFC device 110 or may include use of the NFC device 110 as a remote terminal to access and play the electronic file on the remote computer system 108. In further embodiments, the NFC software saves the location of the electronic file in memory thereby permitting the NFC device 110 to play the memory or message again without additional instructions by the NFC gem 100. In some embodiments, initial file is replaced by another electronic file and accessed by the same information or file location.

While the above examples demonstrates the uploading of an electronic file to a remote computer through the Internet, the invention also encompasses a variation where the electronic file is written directly to the NFC gem (or NFC gemstone mount). Whether or not the file can be directly written to the corresponding NFC chip primarily depends on the memory capacity of the NFC chip itself. It has been found that uniform resource locations (urls) and short audio messages can be directly written to the NFC chip using NFC software and retrieved by a NFC device; however, the current memory capacity of many NFC chips is only about 96 bytes with some up to about 4 kilobytes. Therefore, while the invention envisions the memory capacity of NFC chips will increase thereby permitting the writing of larger electronic files, current memory capacity of NFC chips is too small for most photographs and videos. To this end, in some embodiments, the NFC software determines the amount of available space for writing on the NFC chip and compares the amount of available space to the selected electronic file. If the selected file requires additional memory the NFC software directs uploading of the electronic file to a remote computer system and prevents attempted writing of the electronic file to the NFC chip; whereas if the NFC chip has sufficient available space, the NFC software provides an option of writing the information to the NFC chip.

Figure 7:
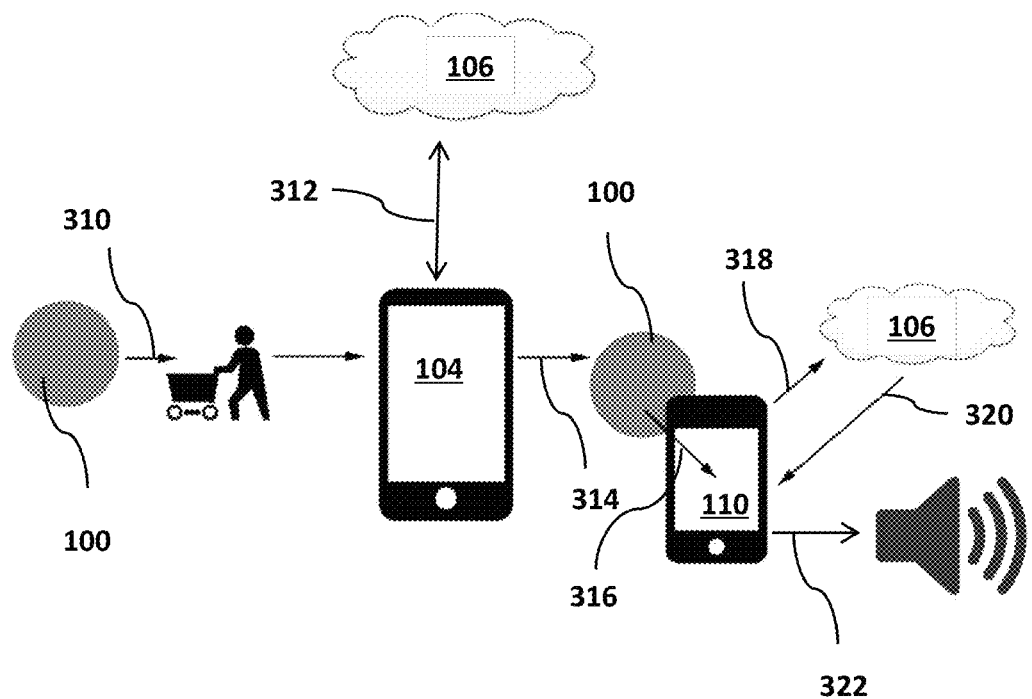
FIG. 7 is a flow chart depicting a subscription service to receive messages using an NFC gem 100.

In another variation, the invention includes embodiments where a third party generates subscription content that can be accessed by the recipient each time the same executable instructions with the same information is executed. An example is shown in FIG. 7. In step 310, a user purchases an NFC gem 100. In step 312, the customer selects a subscription or service. In some embodiments, information and executable instructions for enrolling in the subscription service are prewritten into memory of the NFC gem 100. In other embodiments, enrolling in the subscription service is selected by accessing a remote computer system directly without assistance by the NFC gem. In step 314, mapping information that directs a web browser to the subscription service is written to the NFC gem then transferred to the recipient's NFC device as shown in step. In step 316, the information is transferred to the recipient's NFC device 110. As shown in steps 318 then 320, the NFC device 110 is directs to a web site of the Internet 106 that delivers subscription content to the recipient's NFC device 110 according to the subscription, such as each time the information is transferred to the recipient's NFC device 110. In step 322, the file is played.

Among the subscriptions that may be of particular interest include delivering bible verses, which may be selectable according to religion; delivering horoscopes, which may be selectable based on zodiac sign or lunar year; delivering jewelry information; or other subscription based content.

Referring collectively to FIGS. 1A-7, in some embodiments the NFC gem 10, 100 and NFC device 104 may communicate an identifying tag, such as a string of alphanumeric characters, to identify the particular NFC gem 100 or jewelry article and permit renaming of the identity tag. This feature allows the user to catalog the written information or intended function in a database stored on the NFC device 104 for personal records. In further embodiments, the NFC software accesses a database of saved identity tags together with a corresponding user account to permit the user to replace or upload additional electronic files for use with the same mapping information. This permits the delivery of new content without generating new mapping information. Content can be saved in a database or in memory on the NFC device 104. Accordingly, a series of images or audio files from a same event may be uploaded and delivered thereby providing different memories from a same memorable event while enjoying the gemstone.

The skilled artisan will appreciate that NFC software can be programmed using a variety of programming standards for various operating systems. Accordingly, the NFC software is demonstrated according to various nonlimiting features. For example, a representative graphical user interface (GUI) in the form of screen shots from an NFC device running the NFC software is shown in FIGS. 8A-D. Across the top of each screen, executable options 400, can be provided to access a main page, designated HOME; to upload electronic files, designated UPLOAD; to list a file history, designated HISTORY; and a help feature, designated HELP. At the bottom of the screen the user is provided with options 401 to shop for additional NFC gems or NFC gemstone mountings from a retailer, designated SHOP; to list a saved collection of selectable electronic files for uploading, designated MY COLLECTION; to learn more about a jewelry retailer; designated, ABOUT US; and to contact a jewelry retailer, designated CONTACT. The skilled artisan will appreciate that a variety of executable options can be programmed along the top or removed.

In a preferred embodiment, the user selects the type of file that will be ultimately be retrieved by the recipient and touches the corresponding icon for selection. As shown in FIG. 8A, the icons 402-412 may indicate selectable file types, such as but not limited to an audio file, designated VOICE 402; an image or video file, designated IMAGES & VIDEO 404; a text file, designated TEXT & MESSAGES 406, an execution file, designated TRIGGER 408; or an execution file to open and direct a web browser to an Internet web address, designated URL 410. In addition, in embodiments where a user account is established on a remote computer system over the Internet for uploading, saving and retrieving files, an account settings menu can be accessed by the option designated, MY PROFILE 412.

FIG. 7B depicts an example of a screen shot of a NFC device after selecting VOICE 402 from FIG. 7A. Specifically, if a new audio file is to be generated, voice recording controls are displayed to record 414, stop 416, play 418 and save 420 an audio file. In addition to the above options, the user can be provided with date and recording length data. Such data may be useful when determining whether the NFC gem is to be written with the audio file or whether the audio file is to be uploaded to a computer system over the Internet then mapped. NFC chips have a finite memory and therefore currently save only small files; however, it is envisioned that the memory of NFC chips will increase thereby permitting larger files to be written to the NFC chip. Once the file is saved it may be written to the NFC chip or uploaded to a remote computer system over the Internet, such as to the user's NFC account or to a different third party site. If the file is uploaded to a remote computer system, information for accessing the file is written to the NFC chip by the NFC device together with instructions for launching and directing a browser to the file. As such, the information may include a url coupled to a web browser launch application, site login information, and site password information.

Figure 8D:
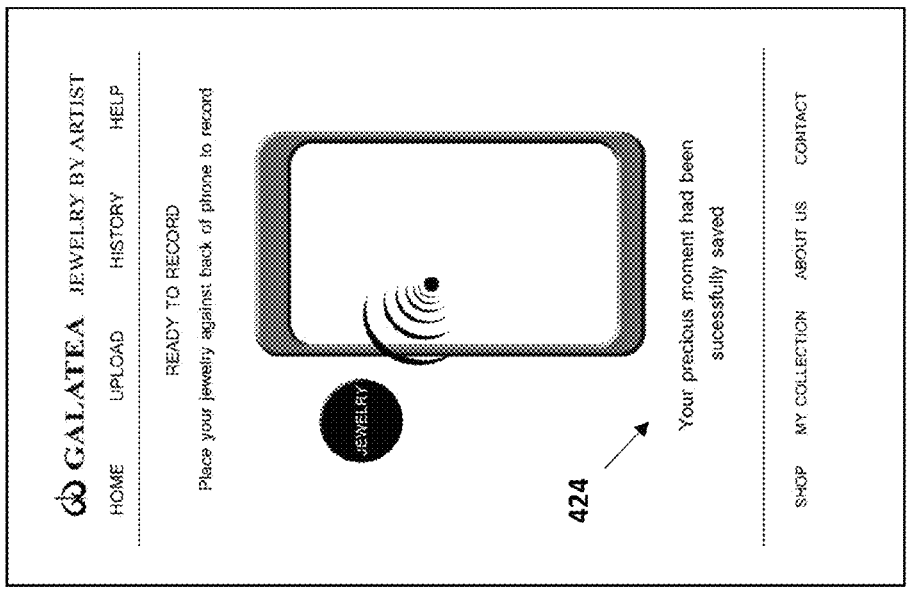
Figure 8C:
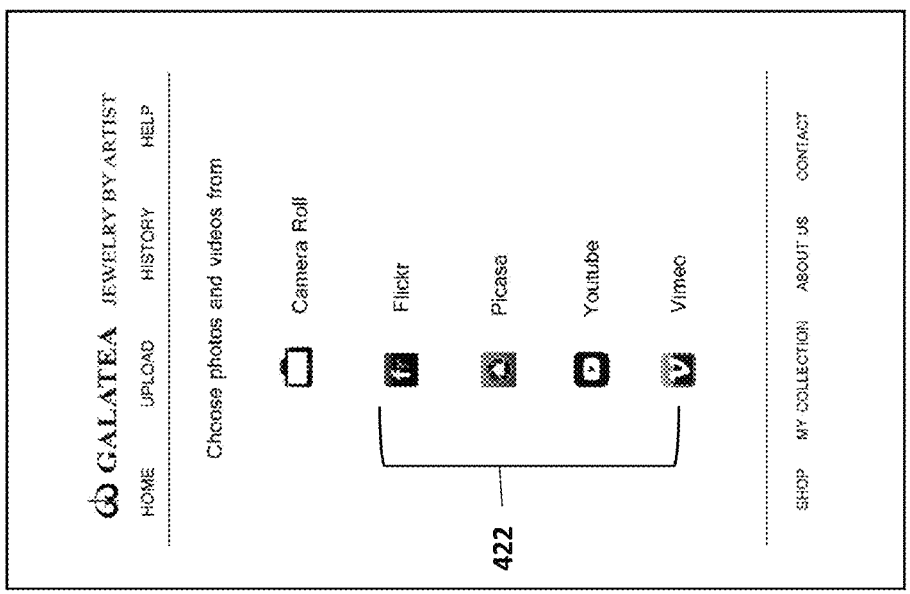

FIG. 8C depicts an example of a screen shot of a NFC device after selecting IMAGES & VIDEOS 404 from FIG. 8A. In some embodiments, pictures or videos saved in memory on the NFC device are selected as files for uploading, storage and later retrieval from an NFC account. In other embodiments, photos or videos are selected from third party Internet web pages as shown in icon set 422, such as but not limited to Flicker, Picasso, Youtube and Vimeo, then saved into memory of the NFC device for uploading, storage and ultimate retrieval from the user's NFC account. In other embodiments, photos or videos are mapped at third party web pages without downloading the photos or videos by the NFC device. The skilled artisan will appreciate that downloading files from third party web pages can be performed in some instances by entering the proper account information into the NFC software, such as login and password information and selecting the photo or video to be downloaded. Mapping of photos or videos without downloading can be accomplished by visiting the url where the file can be played, and saving a provided url for sharing the photo or video akin to what is available at Youtube as of the filing date of this invention. In some embodiments mapping includes copying a url where the image or video file is located. Preferably the NFC device includes a camera to permit taking new pictures or videos for uploading.

FIG. 8D depicts a screen shot for writing information to the NFC gem and indicates when the information is successfully written to the NFC gem indicia 424, such as "Your precious memory has been successfully saved" can be displayed. When mapping electronic files, the mapping information is written to the NFC gem together with executable instructions to launch and direct a browser to the mapped file.

It will be apparent to those skilled in the art to which the invention belongs that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A method of sharing electronic messages through a near field communication (NFC) gem, the method comprising:
   a) providing an NFC device with memory;
   b) providing an NFC gem in close proximity to the NFC device to establish near field communication, wherein the NFC gem is a gemstone having an embedded NFC chip with memory formatted for writing and rewriting, wherein the NFC chip is preloaded with executable instructions to identify whether or not a communicating NFC device is loaded with NFC software for writing to NFC chips or a predetermined version of NFC software and if not, opening and directing a web browser of the NFC device to a web page offering the NFC software for download;

c) running NFC software on the NFC device;
d) generating a new electronic file;
e) using the NFC device to wirelessly upload the electronic file to a remote computer system over the Internet;
f) wirelessly writing information to the NFC chip, the information comprising mapping information for accessing the uploaded electronic file and executable instructions to launch and direct a web browser to the electronic file;
g) providing the NFC gem in close proximity to a different NFC device to establish near field communication;
h) running NFC software on the same or different NFC device;
i) transferring the information from the NFC chip to the different NFC device; and
j) executing the instructions to wirelessly access the electronic file over the Internet.

2. The method according to claim 1, wherein the NFC device is an NFC enabled mobile phone.

3. The method according to claim 1, wherein the gemstone is selected from the group consisting of an agate, an alexandrite, an amber, an ametrine, an amethyst, an aquamarine, an apatile, a beryl, a bloodstone, a chrysoberyl or cat-eye, a citrine, a corundum, a chalcedony, a chysocolla, a coral, a diamond, an emerald, a green beryl, a garnet, a quartz, a lolite, a jadeite, a kupzite, a lapis lazuli, a moonstone, a malachite, a moamite, an onyx, an opal, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon.

4. The method according to claim 1, wherein the gem is a pearl.

5. The method according to claim 1, wherein the electronic file is selected from the group consisting of a text file, a picture file, a video file, and an audio file.

6. The method according to claim 1, wherein the mapping information is assigned by the remote computer system and downloaded to the NFC device prior to writing.

7. The method according to claim 1, wherein the mapping information is assigned by the NFC device prior to writing.

8. The method according to claim 1, further comprising storing an identifier for the NFC gem in one of the NFC devices; and uploading a new electronic file at the remote computer system for access using the information.

9. The method according to claim 8, wherein the new electronic file replaces an initial electronic file.

10. The method according to claim 8, wherein the identifier is one of a plurality of identifiers in a database stored in memory of the one of the NFC devices.

11. The method according to claim 1, wherein the method further comprises forming the NFC gem by combining an NFC chip with a jewelry mount; and inserting the combined NFC chip and jewelry mount into a pearl.

12. The method according to claim 1, wherein the method further comprises forming the NFC gem by forming two distinct cavities in a pearl, wherein a first cavity traverses a center of the pearl and a second cavity is offset from the first; and inserting an NFC chip into the offset cavity.

13. The method according to claim 1, wherein the method further comprises forming the NFC gem by mounting and spiraling an NFC chip around a bead, coating the bead with a protective coating; inserting the coated bead into a mollusk; and incubating the bead within the mollusk until a nacre coating coats the bead.

14. A method of sharing electronic messages through an NFC gem, comprising:
a) providing an NFC device with memory;
b) providing an NFC gem in close proximity to the NFC device to establish near field communication, wherein the NFC gem is a gemstone with an embedded NFC chip that can be written and rewritten, wherein the NFC chip is preloaded with executable instructions to identify whether or not a communicating NFC device is loaded with NFC software for writing to NFC chips or a predetermined version of NFC software and if not, opening and directing a web browser of the NFC device to a web page offering the NFC software for download;
c) running NFC software on the NFC device;
d) generating a new electronic file;
e) wirelessly writing the electronic file to the NFC chip, the electronic file selected from the group consisting of an audio file, a text file and executable instructions to launch and direct a web browser to a uniform resource locator (url);
f) providing the NFC gem in close proximity to a different NFC device to establish near field communication;
g) running NFC software on the different NFC device;
h) transferring the electronic file from the NFC chip to the different NFC device; and
i) playing the electronic file on the NFC device.

15. The method according to claim 14, wherein the NFC device is an NFC enabled mobile phone.

16. The method according to claim 14, wherein the gemstone is selected from the group consisting of an agate, an alexandrite, an amber, an ametrine, an amethyst, an aquamarine, an apatile, a beryl, a bloodstone, a chrysoberyl or cat-eye, a citrine, a corundum, a chalcedony, a chysocolla, a coral, a diamond, an emerald, a green beryl, a garnet, a quartz, a lolite, a jadeite, a kupzite, a lapis lazuli, a moonstone, a malachite, a moamite, an onyx, an opal, a peridot, a red corundum, a ruby, a sardonyx, a sapphire, a spessartime, a sphene, a spinel, a star ruby and sapphire, a sunstone, a tanzanite, a tiger eye, a tourmaline, a topaz, a turquoise, a tsavorite, and a zircon.

17. The method according to claim 14, wherein the gem is a pearl.

18. A method of sharing electronic messages through an NFC gem, comprising:
a) providing an NFC device with memory;
b) providing an NFC gem in close proximity to the NFC device to establish near field communication, wherein the NFC gem is a gemstone with an embedded NFC chip that can be written and rewritten, wherein the NFC chip is preloaded with executable instructions to identify whether or not a communicating NFC device is loaded with NFC software for writing to NFC chips or a predetermined version of NFC software and if not, opening and directing a web browser of the NFC device to a web page offering the NFC software for download;
c) running NFC software on the NFC device;
d) generating a new electronic file;
e) engaging a service provider that delivers electronic files to NFC devices in response to receiving an authorized requests;
f) uploading the electronic file to the service provider;
g) wirelessly writing information to the NFC chip, the information comprising an authorized request and executable instructions to direct the authorized request to the service provider;
h) providing the NFC gem in close proximity to a different NFC device to establish near field communication;

i) running NFC software on the different NFC device;
j) transferring the information from the NFC chip to the different NFC device; and
k) executing the instructions thereby requesting the electronic file by the different NFC device; and
l) delivering the electronic file from the service provider to the different NFC device.

19. The method according to claim 18, wherein each time a same authorized request is received by the service provider a different electronic file or a random electronic file is delivered to the different NFC device.

20. The method according to claim 18, wherein the electronic contains a horoscope or a bible verse.

21. The method according to claim 18, wherein the authorized request is defined by the service provider and transferred to the NFC device.

22. The method according to claim 18, wherein the authorized request is defined by the NFC software in the NFC device.

23. The method according to claim 18, wherein the NFC device is an NFC enabled mobile phone.

24. A method of sharing electronic messages through an NFC gem, comprising:

a) providing an NFC device with memory;
b) providing an NFC gem in close proximity to the NFC device to establish near field communication, wherein the NFC gem is a gemstone with an embedded NFC chip that can be written and rewritten, wherein the NFC chip is preloaded with executable instructions to identify whether or not a communicating NFC device is loaded with NFC software for writing to NFC chips or a predetermined version of NFC software and if not, opening and directing a web browser of the NFC device to a web page offering the NFC software for download;
c) running NFC software on the NFC device;
d) obtaining a url from a web site;
e) wirelessly writing information to the NFC chip, the information comprising the url and executable instructions to launch and direct a browser to the url;
f) providing the NFC gem in close proximity to a different NFC device to establish near field communication;
g) running NFC software on the different NFC device;
h) transferring the information from the NFC chip to the different NFC device; and
i) executing the instructions thereby browsing to the url.

* * * * *